(12) United States Patent
Cao et al.

(10) Patent No.: US 11,403,479 B2
(45) Date of Patent: Aug. 2, 2022

(54) FEEDBACK SIGNALING TO FACILITATE DATA CLASSIFICATION FUNCTIONALITY OF A SPIKING NEURAL NETWORK

(71) Applicant: INTEL CORPORATION, Santa Clara, CA (US)

(72) Inventors: Yongqiang Cao, Portland, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 16/646,493

(22) PCT Filed: Dec. 19, 2017

(86) PCT No.: PCT/US2017/067404
§ 371 (c)(1),
(2) Date: Mar. 11, 2020

(87) PCT Pub. No.: WO2019/125421
PCT Pub. Date: Jun. 27, 2019

(65) Prior Publication Data
US 2020/0272815 A1 Aug. 27, 2020

(51) Int. Cl.
*G06K 9/00* (2022.01)
*G06K 9/62* (2022.01)
(Continued)

(52) U.S. Cl.
CPC ....... *G06K 9/00536* (2013.01); *G06K 9/6262* (2013.01); *G06N 3/049* (2013.01); *G06N 3/08* (2013.01); *G06T 9/00* (2013.01)

(58) Field of Classification Search
CPC ............. H03F 1/0277; H03F 2200/171; H03F 2200/555; H03F 2200/414;
(Continued)

(56) References Cited

U.S. PATENT DOCUMENTS

2012/0308136 A1   12/2012   Izhikevich
2013/0297541 A1*  11/2013   Piekniewski .......... G06N 3/088
                                                          706/26
(Continued)

OTHER PUBLICATIONS

Schliebs, S; Kasabov N, " Evolving Spiking neural networks: A Survey" (hereafter Kasabov). (Year: 2013).*
(Continued)

*Primary Examiner* — Dhaval V Patel
(74) *Attorney, Agent, or Firm* — Essential Patents Group, LLP.

(57) ABSTRACT

Techniques and mechanisms to facilitate a data classification functionality by communicating feedback signals with a spiked neural network. In an embodiment, input signaling, provided to the spiking neural network, results in one or more output spike trains which are indicative of that the input signaling corresponds to a particular data type. Based on the one or more output spike trains, feedback signals are variously communicated each to a respective node of the spiking neural network. The feedback signals variously control signal response characteristics of the nodes. Subsequent output signaling by the spiking neural network, in further response the input signaling, is improved based on the feedback control of nodes' signal responses. In another embodiment, the feedback signals are used to adjust synaptic weight values during training of the spiking neural network.

24 Claims, 9 Drawing Sheets

(51) Int. Cl.
*G06N 3/04* (2006.01)
*G06N 3/08* (2006.01)
*G06T 9/00* (2006.01)

(58) Field of Classification Search
CPC ........ H03F 2200/417; H03F 2200/336; H03G 1/0088; H03G 1/0029; H03G 3/001; H03G 3/3042; G06V 10/00; G06V 20/00; G06V 30/00; G06V 40/00; G06V 2201/00; G06K 9/00536; G06K 9/6262; G06K 9/6281; G06K 1/00; G06K 3/00; G06K 5/00; G06K 7/00; G06K 9/00; G06K 11/00; G06K 13/00; G06K 15/00; G06K 17/00; G06K 21/00; G06K 19/00; G06K 2207/00; G06K 2215/00; G06T 9/00; G06T 1/00; G06T 3/00; G06T 5/00; G06T 7/00; G06T 11/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00; G06T 2219/00

See application file for complete search history.

(56) References Cited

U.S. PATENT DOCUMENTS

| | | |
|---|---|---|
| 2013/0325775 A1 | 12/2013 | Sinyavskiy et al. |
| 2013/0325777 A1 | 12/2013 | Petre et al. |
| 2014/0219497 A1 | 8/2014 | Richert |
| 2018/0075345 A1* | 3/2018 | Gottfried ................ G06N 3/04 |
| 2019/0108434 A1* | 4/2019 | Wozniak ................ G06N 3/088 |

OTHER PUBLICATIONS

International Search Report and Written Opinion from PCT/US2017/067404 dated Sep. 21, 2018, 17 pgs.
International Preliminary Report on Patentability from PCT/US2017/067404 dated Jul. 2, 2020, 7 pgs.

* cited by examiner

FEEDBACK SIGNALING TO FACILITATE DATA CLASSIFICATION FUNCTIONALITY OF A SPIKING NEURAL NETWORK

CLAIM OF PRIORITY

This Application is a National Stage Entry of, and claims priority to, PCT Application No. PCT/US17/67404, filed on 19 Dec. 2017 and titled "FEEDBACK SIGNALING TO FACILITATE DATA CLASSIFICATION FUNCTIONALITY OF A SPIKING NEURAL NETWORK", which is incorporated by reference in its entirety for all purposes.

BACKGROUND

Embodiments described herein generally relate to spiking neural networks, and more particularly, but not exclusively, relate to using a feedback signal to facilitate image classification functionality of a spiking neural network.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

Existing neural network technologies—e.g., those which include a recurrent neural network (RNN) such as long short-term memory (LSTM)—are used in some types of object recognition and other image analysis. Configuring a conventional deep learning neural network system to recognize a given object has—to date—required training of the system with a large number of reference images which variously represent objects of the same object type. As the applications for neural networks continue to grow in number and variety, there is expected to be an increasing premium placed on improvements to efficient training—e.g., for image analysis and other applications.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
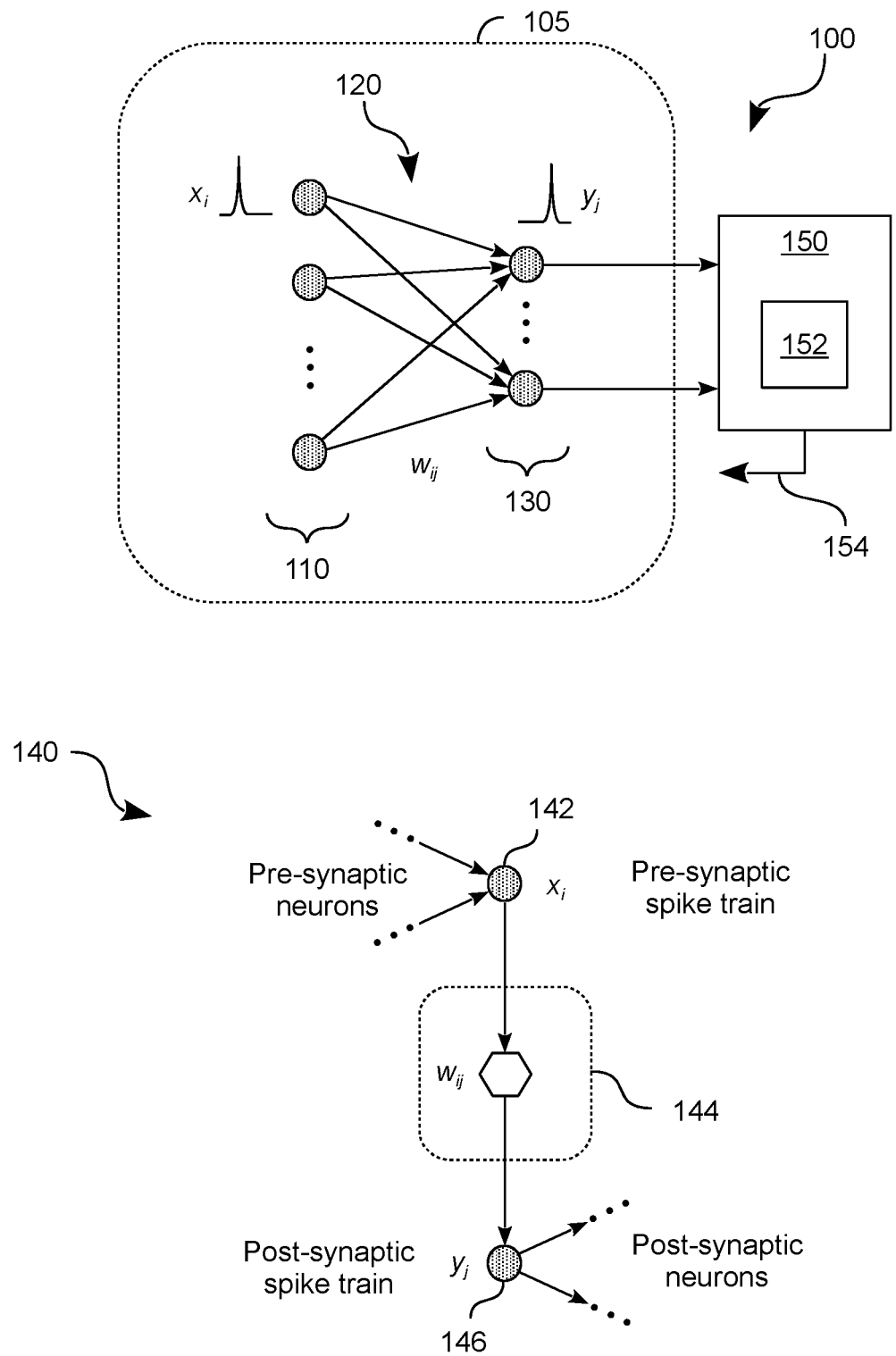
FIG. 1 shows diagrams each illustrating features of a simplified neural network according to an embodiment.

Embodiments described herein variously provide techniques and mechanisms whereby one or more feedback signals facilitate a functionality of a spiking neural network to detect that some data which is being evaluated—or which is subsequently to be evaluated—belongs to a particular type of data (a "data type" or "data class," herein). Feedback signaling may be communicated, for example, as part of a training process by which the spiking neural network learns to detect for indicia of a given data type (or "data class"). Alternatively or in addition, feedback signaling may be provided as part of a process to detect whether some data under test is an instance of a data type which the spiking neural network was previously trained to recognize.

As used herein, "input node" refers to a node by which a signal is received at a spiking neural network. The term "output node" (or "readout node") refers herein to a node by which a signal is communicated from a spiking neural network. The term "input signaling" refers herein to one or more signals (e.g., including one or more spike trains)—independent of, and distinct from, any feedback signal—which are variously received each at a respective input node of a spiking neural network. The term "output signaling" refers herein to one or more spike trains which are variously communicated each from a respective output node of a spiking neural network. The term "spiked input signals" is also used herein to refer to one or more input spike trains, where "spiked output signals" similarly refers to one or more output spike trains. The term "feedback signaling" refers to one or more signals (e.g., including one or more spike trains) which are based on output signaling from a spiking neural network, the one or more signals communicated each to a respective node of the spiking neural network.

The term "forward stage" refers to a processing stage comprising signaling, within a spiking neural network, which is based on input signaling received at the spiking neural network. Forward stage signaling may result in output signaling by a spiking neural network. "Feedback stage" refers herein to a processing stage comprising a communication of one or more signaling, within a spiking neural network, which is based on input signaling received at the spiking neural network. A feedback stage may include both a communication of one or more feedback signals and a concurrent communication of forward signaling which, for example, is similar to earlier-in-time forward signaling (on which the one or more feedback signals may be based) of a forward stage.

The term "reference data" refers to data which is to be used as a basis for training of a spiking neural network to recognize one or more data types. "Reference signaling" refers herein to one or more signals (e.g., including one or more spike trains) which represent an encoded version of reference data—e.g., wherein such reference signaling is provided to, or is generated by, a spiking neural network to facilitate training thereof. Unless otherwise indicated, reference signaling is understood to be a type of forward signaling, which is to be distinguished from any feedback signaling. The term "reference feedback signaling" refers to feedback signaling which is based on reference signaling.

For example, reference signaling may result in reference output signaling from the spiking neural network, wherein reference feedback signaling is subsequently generated based on such reference output signaling.

The term "test data" (or "data under test") refers to data which is being evaluated (or is to be evaluated) to detect whether such data includes an instance of a data type which a spiking neural network has been trained to recognize. "Test signaling" refers herein to one or more signals (e.g., including one or more spike trains) which represents an encoded version of test data—e.g., wherein such test signaling is provided to, or generated by, a spiking neural network for evaluation of the test data it represents. Unless otherwise indicated, test signaling is understood to be a type of forward signaling. The term "test feedback signaling" refers to feedback signaling which is based on test signaling. For example, test signaling may result in test output signaling from the spiking neural network, wherein test feedback signaling is subsequently generated based on such test output signaling.

In some embodiments, image recognition functionality of a spiking neural network includes or is otherwise based on an ability of the spiking neural network to identify (recognize) a given test image as belonging to a particular image type—e.g., wherein the image type is one of multiple image types which the spiking neural network has been trained to detect. One or more reference images may be used, each as an exemplar of a respective image type, as a basis for training the spiking neural network to recognize one or more image types. Image recognition functionality may implement a corresponding object recognition functionality, wherein recognition of a test image as belonging to a particular image type includes detecting that the test image includes a representation of an object type (e.g., one of multiple object types which the spiking neural network has been trained to recognize). By way of illustration and not limitation, an object type to be recognized by a spiking neural network may comprise one or more types of characters (including any of a variety of letter types, symbol types, etc.), geometric shape types and/or the like. Alternatively or in addition, an object type may include one or more types of biometric markers including, for example, any of a variety face types, fingerprint types, retina pattern types or the like. Conventional image recognition techniques for classifying an imaged object with a neural network system have—to date—been highly sensitive to "noisy" components which, for example, are due to another part of the imaged environment. Such conventional techniques variously rely on a neural network receiving and processing image data in a static manner which, for example, is not adaptive to the image data itself.

Certain features of various embodiments are described herein with reference to feedback signaling which facilitates image recognition functionality of a spiking neural network. However, some embodiments are not limited to the recognition of one or more image types (or corresponding imaged object types) with a spiking neural network. For example, feedback signaling may additionally or alternatively be adapted, in some embodiments, to facilitate the recognition of one or more video sequence types (and corresponding action types). Such video recognition functionality may include, or otherwise be based on, an ability of the spiking neural network to recognize a test video sequence as belonging to a particular video sequence type—e.g., including detecting that the test video sequence includes a representation of a type of action (such as one action type of multiple action types which the spiking neural network has been trained to recognize). In other embodiments, feedback signaling may be adapted to facilitate audio recognition with a spiking neural network. Such audio recognition functionality may include, or otherwise be based on, an ability of the spiking neural network to recognize a test audio sequence as belonging to a particular audio sequence type—e.g., one of multiple audio sequence types which the spiking neural network has been trained to recognize.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices which are configured to provide feedback signaling for a spiking neural network.

FIG. 1 illustrates an example diagram of a system 100 comprising a spiking neural network 105, providing an illustration of connections 120 between a first set of nodes 110 (e.g., neurons) and a second set of nodes 130 (e.g., neurons). Some or all of a neural network (such as the spiking neural network 105) may be organized into multiple layers—e.g., including input layers and output layers. It will be understood that the spiking neural network 105 only depicts two layers and a small number of nodes, but other forms of neural networks may include a large number of variously configured nodes, layers, connections, and pathways.

Data that is provided into the neural network 105 may be first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$) from neuron i (e.g., located in a layer of the first set of nodes 110) to neuron j (e.g., located in a layer of the second set of nodes 130). The input received by neuron i is depicted as value $x_i$, and the output produced from neuron j is depicted as value $y_j$. Thus, the processing conducted in a neural network is based on weighted connections, thresholds, and evaluations performed among the neurons, synapses, and other elements of the neural network.

In an example, the neural network 105 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 105 further shows the receipt of a spike, represented in the value $x_i$, at neuron i in a first set of neurons (e.g., a neuron of the first set of nodes 110). The output of the neural network 105 is also shown as a spike, represented by the value $y_j$, which arrives at neuron j in a second set of neurons (e.g., a neuron of the first set of nodes 110) via a path established by the connections 120. In a spiking neural network all communication occurs over event-driven action potentials, or spikes. In an example, spikes convey no information other than the spike time as well as a source and destination neuron pair. Computations may variously occur in each a respective neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron may provide functionality similar to that of a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

FIG. 1 also illustrates an example inference path 140 in a spiking neural network, such as may be implemented by a form of the neural network 105 or other forms of neural networks. The inference path 140 of the neuron includes a pre-synaptic neuron 142, which is configured to produce a pre-synaptic spike train $x_i$ representing a spike input. A spike train is a temporal sequence of discrete spike events, which provides a set of times specifying at which time a neuron fires.

As shown, the spike train $x_i$ is produced by the neuron before the synapse (e.g., neuron 142), and the spike train $x_i$ is evaluated for processing according to the characteristics of a synapse 144. For example, the synapse may apply one or more weights, e.g., weight $w_{ij}$, which are used in evaluating the data from the spike train $x_i$. Input spikes from the spike train $x_i$ enter a synapse such as synapse 144 which has a weight $w_{ij}$. This weight scales what the impact of the presynaptic spike has on the post-synaptic neuron (e.g., neuron 146). If the integral contribution of all input connections to a post-synaptic neuron exceeds a threshold, then the post-synaptic neuron 146 will fire and produce a spike. As shown, $y_j$ is the post-synaptic spike train produced by the neuron following the synapse (e.g., neuron 146) in response to some number of input connections. As shown, the post-synaptic spike train $y_j$ is distributed from the neuron 146 to other post-synaptic neurons.

Some embodiments variously provide feedback signaling which facilitates functionality of spiking neural network 105 to recognize that input signaling—e.g., including spike train $x_i$—is indicative of a particular data type. For example, spiking neural network 105 may be trained, based in part on feedback signaling, to generate output signaling of an output signaling type which corresponds to that particular data type. The output signaling type may be predefined, prior to such training, as the signaling type which is to signify detection of the data type. In some embodiments, training enables spiking neural network 105 to generate any of multiple output signaling types in response to some test signaling, where the multiple output signaling types each correspond to (e.g., are each to represent) a different respective one of multiple data types.

By way of illustration and not limitation, system 100 may further comprise or couple to hardware and/or executing software (such as the illustrative circuitry 150 shown) which is to receive and evaluate a first one or more output spike trains from the second set of nodes 130. Circuitry 150 may include any of various processors, application specific integrated circuits (ASICs), field programmable gate arrays (FPGAs) and/or other circuitry configured to identify whether the first one or more output spike trains is/are indicative of any output signaling type—and, correspondingly, a data type—which the spiking neural network has been trained to recognize. For example, circuitry 150 may include or otherwise have access to memory circuits which store reference data 152 that identifies one or more reference signal characteristics as being indicative of a given image type. Based on such one or more reference signal characteristics, circuitry 150 may identify whether a particular output signaling type is, according to some predefined criteria, a sufficiently close match to the first one or more output spike trains and/or a closest match (e.g., from among multiple output signaling types) to the first one or more output spike trains. Circuitry 150 may output a signal 154 representing a result of such a determination—e.g., wherein signal 154 includes reference output signaling which has been allocated to function as an epitome, or ideal, of a particular output signaling type. Signal 154 (and/or one or more other signals based on signal 154) may be provided as reference feedback training signaling to spiking neural network 105.

In some embodiments, circuitry 150, or other such logic, may additionally or alternatively facilitate test processing to identify an image type as corresponding to a second one or more output spike trains (e.g., including spike train $y_j$) received from the second set of nodes 130—e.g., wherein such identifying includes selecting one image type from a plurality of image types which the spiking neural network is already trained to recognize.

Such test processing with spiking neural network 105 may include a second one or more spike trains being sent from the second set of nodes 130 to circuitry 150, wherein the second one or more spike trains are based on input signaling which (for example) represents a test image. Circuitry 150 may evaluate the second one or more output spike trains to identify whether a particular output signaling type is, according to some predefined criteria, a sufficiently close match to the second one or more output spike trains and/or a closest match (e.g., from among multiple output signaling types) to the second one or more output spike trains. Such an evaluation may be based on reference signal characteristics such as those identified by reference data 152, for example.

In such an embodiment, a result of the evaluation of the second one or more output spike trains may be additionally or alternatively represented by signal 154—e.g., wherein one or more nodes of spiking neural network 105 variously receive test feedback signaling based on signal 154. Such one or more nodes may variously receive respective test feedback signaling while test signaling is also being communicated to and/or in the spiking neural network. For example, the test feedback signaling may variously alter or otherwise determine whether and/or how nodes are to continue communicating respective spike trains based on the test data.

In some embodiments, nodes of spiking neural network 105 are of a Leaky Integrate-and-Fire (LIF) type—e.g., wherein, based on one or more spiking signals received at a given node j, the value of a membrane potential $v_m$, of that node j may spike and then decay over time. The spike and decay behavior of such a membrane potential $v_m$ may, for example, be according to the following:

$$\tau_m \left( \frac{dv_m}{dt} \right) \propto -(v_m - v_{rest}) + w_{ij} \cdot I_{ij} + J_b, \quad (1)$$

where $v_{rest}$ is a resting potential toward which membrane potential $v_m$ is to settle, $\tau_m$ is a time constant for an exponential decay of membrane potential $v_m$, $w_{ij}$ is a synaptic weight of a synapse from another node i to node j, $I_{ij}$ is a spiking signal (or "spike train") communicated to node j via said synapse, and $J_b$ is a value that, for example, is based on a bias current or other signal provided to node j from some external node/source. The spiking neural network 105 may operate based on a pre-defined threshold voltage $V_{threshold}$, wherein the node j is configured to output a signal spike in response to its membrane potential $v_m$ being greater than $V_{threshold}$.

Additionally or alternatively, updating a value of weight $w_{ij}$ over time may include changing the value from one time period (t) to a next time period (t+1) in a sequence of time periods during operation of the spiking neural network 105. Such changing of weight $w_{ij}$ may, for example, be according to the following:

$$w_{ij}(t+1) \propto w_{ij}(t) \cdot e^{-(t/\tau_g)} + \delta_t, \quad (2)$$

where $\tau_g$ is the time-constant for decay of weight $w_{ij}$, and $\delta_t$ is a value based on the detection during time period t of a signal spike (or some other predefined signal spiking pattern) by a spike train communicated to node j. In one example embodiment, detection of the spike (spiking pattern) during time period t may result in $\delta_t$ being set to a binary value (e.g., "1") or otherwise set to at least some minimum threshold value which contributes to vm being greater than $V_{threshold}$. Otherwise, $\delta_t$ may be set to another binary value (e.g., "0") or otherwise set to below such a minimum threshold value.

Figure 2:
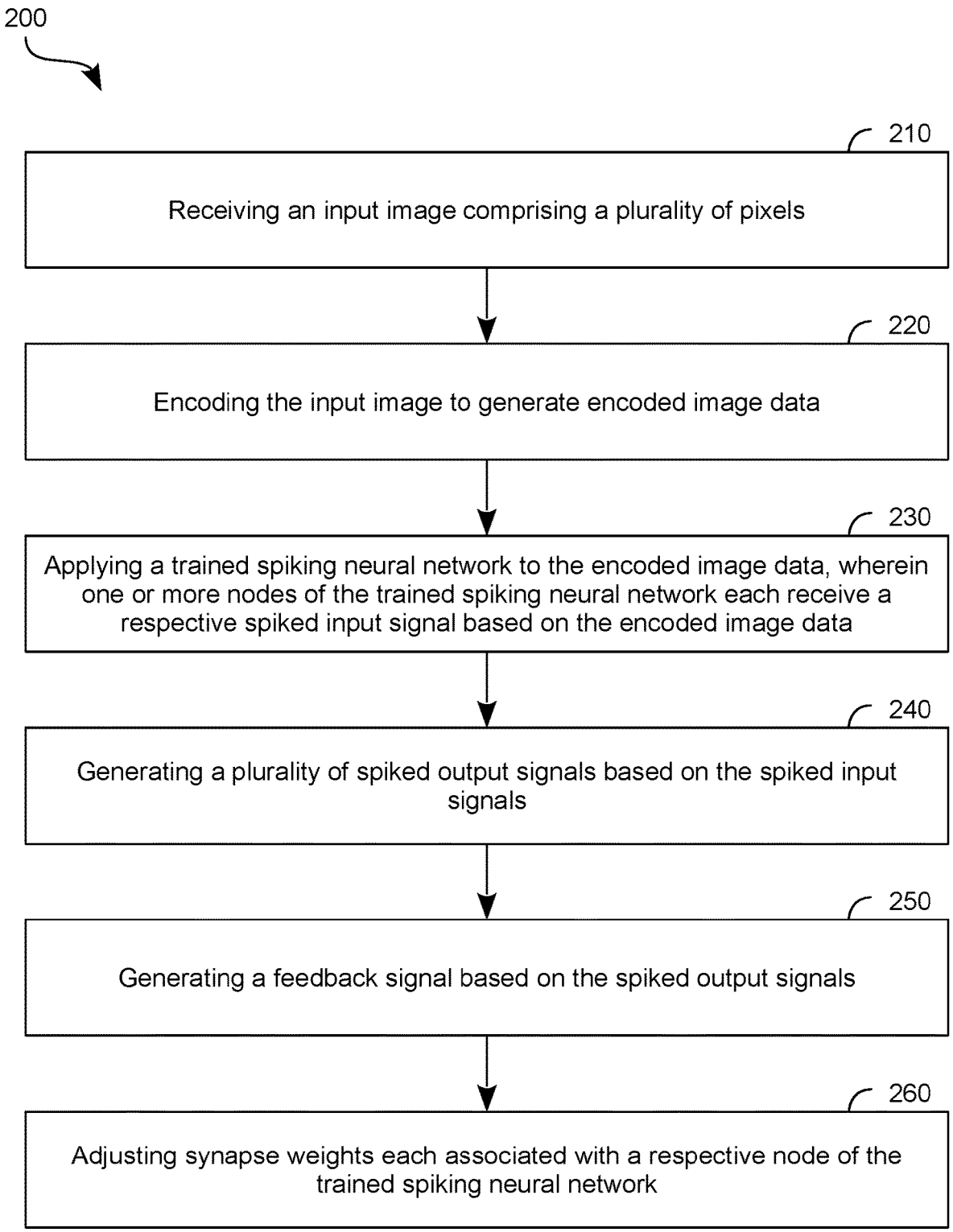
FIG. 2 is a flow diagram illustrating elements of a method to provide image recognition functionality with a spiking neural network according to an embodiment.

FIG. 2 shows features of a method 200 to facilitate data classification functionality with a spiking neural network according to an embodiment. Method 200 is one example of an embodiment wherein feedback signaling facilitates an ability of a spiking neural network to detect whether test data belongs to some class of data ("data type"). Such feedback signaling may improve one or both of processing to train the spiking neural network, and test processing to evaluate data using an already-trained spiking neural network. Some or all of method 200 may be performed with spiking neural network 105, for example.

As shown in FIG. 2, method 200 may comprise (at 210) receiving an input image comprising a plurality of pixels, and (at 220) encoding the input image to generate encoded image data. For example, the receiving 210 may include receiving signaling which represents the plurality of pixels in a format other than that of any spiked signaling encoding scheme. In such an embodiment, the encoding at 220 may include an initial conversion of such received signaling into one or more spike trains. Alternatively, the receiving at 210 may include storing data which is subsequently to be encoded at 220 to generate signaling for use by a spiked neural network. In such an embodiment, the encoded image data may include one or more spike trains, or other signaling which a spiked neural network may use to generate spike train signaling.

Method 200 may further comprise (at 230) applying a trained spiking neural network to the encoded image data, wherein one or more nodes of the trained spiking neural network each receive a respective spiked input signal based on the encoded image data. Although some embodiments are not limited in this regard, method 200 may additionally or alternatively include operations (not shown)—e.g. performed prior to the applying at 230—by which the spiked neural network is trained. For example, such operations may include training the spiking neural network based on one or more reference images which each represent a low-noise representation of a respective object which the spiking neural network is to be configured to recognize. Such training of the spiking neural network may comprise a forward training stage and a feedback training stage which are each based on the one or more reference images.

In some embodiments, the forward training stage may comprise, for each reference image of the one or more reference images, encoding the reference image to generate encoded reference image data including a respective one or more reference spiked input signals. For each such reference image, the respective one or more reference spiked input signals may be received with the plurality of nodes of the spiking neural network, wherein the spiked neural network generates a respective one or more reference spiked output signals based on the respective one or more reference spiked input signal. In some embodiments, other spiked signals (based on the respective one or more reference spiked input signals) may each be communicated between a respective two nodes of the spiking neural network. In some embodiments, the forward training stage may further comprise adjusting one or more weights each associated with a respective synapse of the spiking neural network. The one or more weights may be adjusted each based on a timing of signals spiking in the spiking neural network during the forward training stage.

The feedback training stage may comprise, for example, receiving one or more reference spiked output signals which are generated by the forward training stage. A feedback signal may be generated based on such one or more reference spiked output signals. In such an embodiment, feedback training stage may further comprise adjusting one or more weights each associated with a respective synapse of the spiking neural network—e.g., wherein the one or more weights are adjusted each based on a timing of signals spiking in the spiking neural network during the feedback training stage.

Referring again to the applying at 230, nodes of the trained spiking neural network may variously communicate respective spike trains based on the encoded image data—e.g., wherein such communication results in the spiked neural network generating one or more output spike trains. For example, method 200 may further comprise (at 240) generating one or more spiked output signals based on the applying the trained spiking neural network to the encoded image data.

In an embodiment, method 200 further comprises (at 250) generating one or more feedback signals based on the spiked output signals. Generating the one or more feedback signals at 250 may include may be based on an evaluation of a first output spike train from a first output node of the spiked neural network—e.g., wherein the evaluation determines that the first output spike train meets a test criteria and/or more closely satisfies the test criteria (as compared to any other output spike train that may be generated at 240). For example, the evaluating may determine that some predefined output signaling type is a sufficiently close match to the first output spike train and/or is a closest match (e.g., from among multiple output signaling types) to the first output spike train. Some or all of the one or more feedback signals may each include or otherwise be based on such a first output signal. In some embodiments, some or all of the one or more feedback signals each include or are otherwise based on an ideal representation of some predefined output signaling type which has been identified as corresponding to the first output signal.

Method 200 may further comprise (at 260) based on the one or more feedback signals, adjusting synapse weights each associated with a respective node of the trained spiking neural network. For example, the one or more feedback signals may be used to selectively excite (e.g., amplify) or inhibit (e.g., attenuate or disable) signal spiking by one or more input nodes of the spiking neural network. By altering the signal spiking of such one or more input nodes, the one or more feedback signals may adjust the respective weight values assigned to various synapses of the spiked neural network.

Figure 3A:
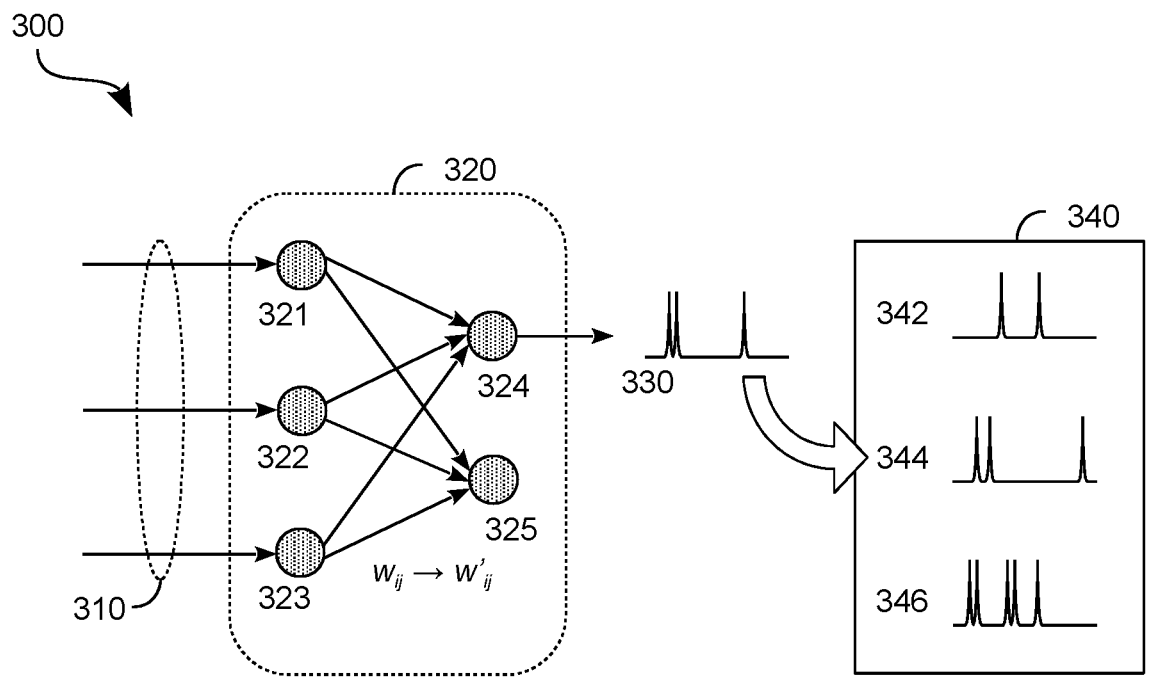
FIG. 3 shows diagrams illustrating stages of processing to train a spiking neural network according to an embodiment.
Figure 3A:
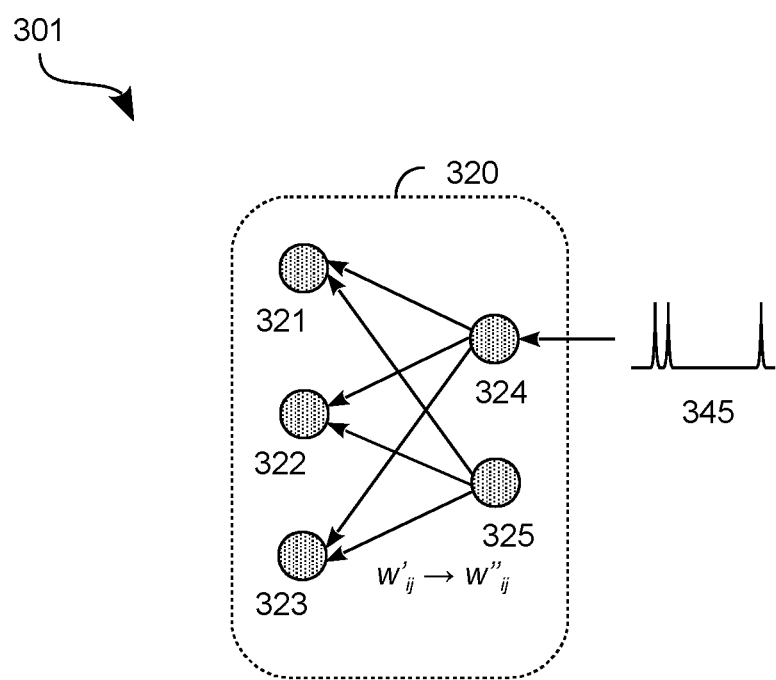

FIG. 3A shows features of processing, according to an embodiment, to train a spiking neural network to provide a data classification functionality. More particularly, FIG. 3A shows a forward training stage 300 and a feedback training stage 301 of a process which, for example, may train a spiking neural network to recognize an image as belonging to a particular image type. Such training may be performed prior to, or as part of, operations of method 200—e.g., wherein the training is to enable an image recognition functionality of spiking neural network 105, for example. Prior to the training, an output signaling type may be selected and assigned, a priori, to serve as an ideal (or "desired") output for the spiking neural network to provide when indicating recognition of the image type in question.

As shown in FIG. 3A, forward training stage 300 may be performed with a spiking neural network 320 which, for example, includes one or more input nodes—such as the illustrative nodes 321, 322, 323 shown—each coupled to receive a respective signal of one or more input signals 310. The one or more input signals 310 may each include a respective spike train or, alternatively, signaling which is ready for conversion into a corresponding spike train by one of nodes 321, 322, 323. The one or more input signals 310 may result in spike trains being variously communicated in spiked neural network 320 via synapses thereof.

To avoid obscuring certain features of various embodiments, spiking neural network 320 is shown as having a somewhat simple topology wherein each input node is coupled to each output node, with no intervening nodes coupled therebetween. More particularly, each of input nodes 321, 322, 323 is coupled to each of output nodes 324, 325 via a different respective synapse. However, the particular number and configuration of nodes 321-325 is merely illustrative, and any of various other spiking neural network topologies may be used, in different embodiments, to enable the updating of synaptic weights based on feedback signaling.

Stage 300 represents a "forward" (shown as left-to-right) signaling stage of a training process, wherein one or more input signals 310, and associated signal spiking by nodes 321-325, are based on a reference image. The reference image may be a clean (low noise) representation of an object which the neural network is to be trained to recognize. Forward training stage 300 may include input nodes 321-323 beginning the communication of various spike trains in spiking neural network 320 via respective synapses thereof. In some embodiments, one or more synaptic weight values may be updated in response to signal spiking of such forward training signals—e.g., prior to or otherwise independent of any signaling of the subsequent feedback training stage 301. For example, based on the timing of signal spiking in the neural network during forward training, respective weights (including a weight $w_{ij}$) of some or all synapses may be variously updated (symbolized by "$w_{ij} \rightarrow w_{ij}'$"). Such updating of synaptic weights may be according to supervised spike-timing dependent plasticity (SSTDP) rules that, for example, are adapted from conventional techniques for neural network training.

The forward training signals variously communicated by between nodes of spiking neural network 320 may result in output signaling being provided by spiked neural network 320. In the example embodiment shown, such output signaling may include an output spike train 330 provided by output nod 324. In an embodiment, output spike train 330 is evaluated—e.g., by circuitry 150 or other such hardware and/or software which is executing with a processor and a memory. Such evaluating may determine whether, according to some predefined test criteria, output spike train 330 is to provide a basis for one or more feedback signals being provided, each to a respective node of spiking neural network 320, during feedback training stage 301. In the example embodiment shown, evaluating of output spike train includes accessing some reference data 340 which specifies or otherwise indicates respective characteristics of one or more output signaling types (e.g., including the illustrative output signaling types 342, 344, 346 shown). Based on reference data 340, a determination may be made as to which of output signaling types 342, 344, 346 is a closest match to output spike train 330 and/or which (if any) of output signaling types 342, 344, 346 is a sufficiently close match to output spike train 330. In the illustrative scenario shown, output signaling type 344 is identified as a closest match to output spike train 330—e.g., based on a similarity between respective spiking patterns of output signaling type 344 and output spike train 330. In some embodiments, selection of output signaling type 344 may additionally or alternatively be based on reference data 340 indicating an association of output signaling type 344 with the output node 324 which provided output spike train 330.

As shown at feedback training stage 301, one or more feedback training signals (e.g., including the illustrative feedback spike train 345 shown) may be subsequently communicated each to a respective node of spiking neural network 320, the one or more feedback training signals based on the output signaling which is generated by the forward training stage 300. In some embodiments, feedback spike train 345 includes or is otherwise based on the output signaling type 344 which was identified as corresponding to (e.g., as being a closest match to) output spike train 330. For example, feedback spike train 345 may function an exemplary version of output signaling type 344 which is to be used for adjusting one or more synaptic weight values. Feedback spike train 345 may be sent back into spiking neural network 320—e.g., via the same output node 324 which provided output spike train 330—as a teaching spike train which is concurrent with a continued receipt of one or more input signals 310 via input nodes 321, 322, 323. In response to feedback spike train 345, subsequent spike trains may be variously communicated (this time, in a right-to-left direction) in spiking neural network 320. Additional synaptic weight updating (e.g., according to SSTDP rules) may be employed, based on signal spiking during feedback training stage 301, to further adjust some or all synapse weights (symbolized by "$w_{ij}' \rightarrow w_{ij}''$"). In such an embodiment, the one or more input signals 310 may be used—in combination with feedback spike train 345—as teaching signals during the feedback training stage.

Figure 3B:
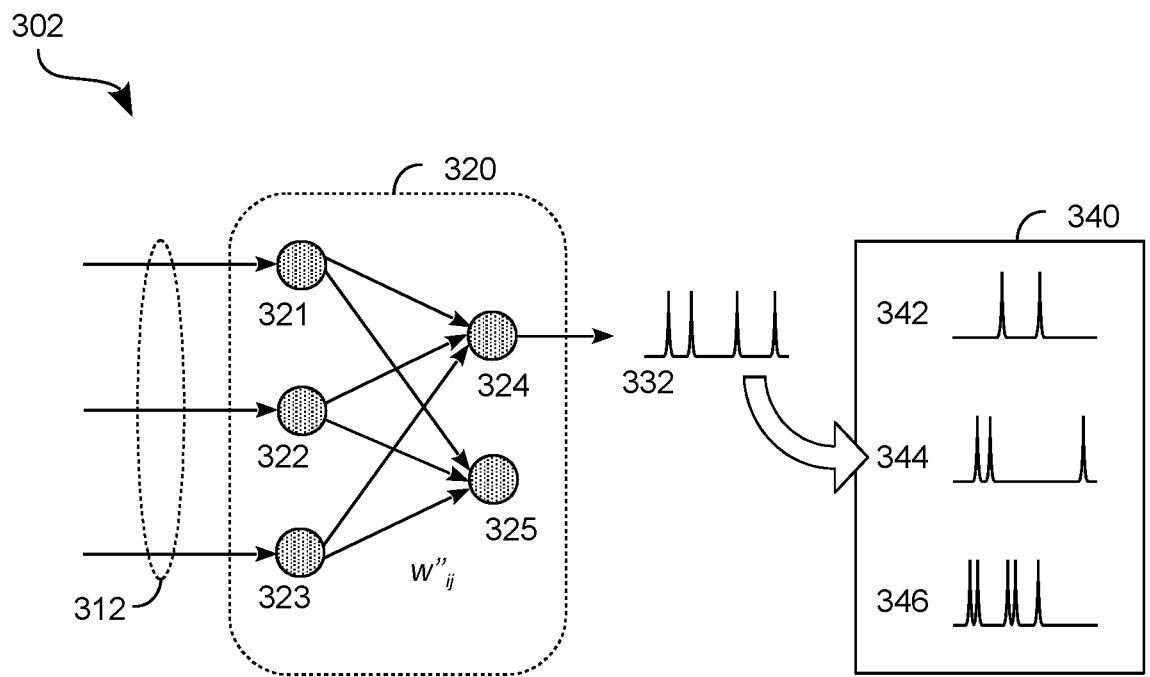
Figure 3B:
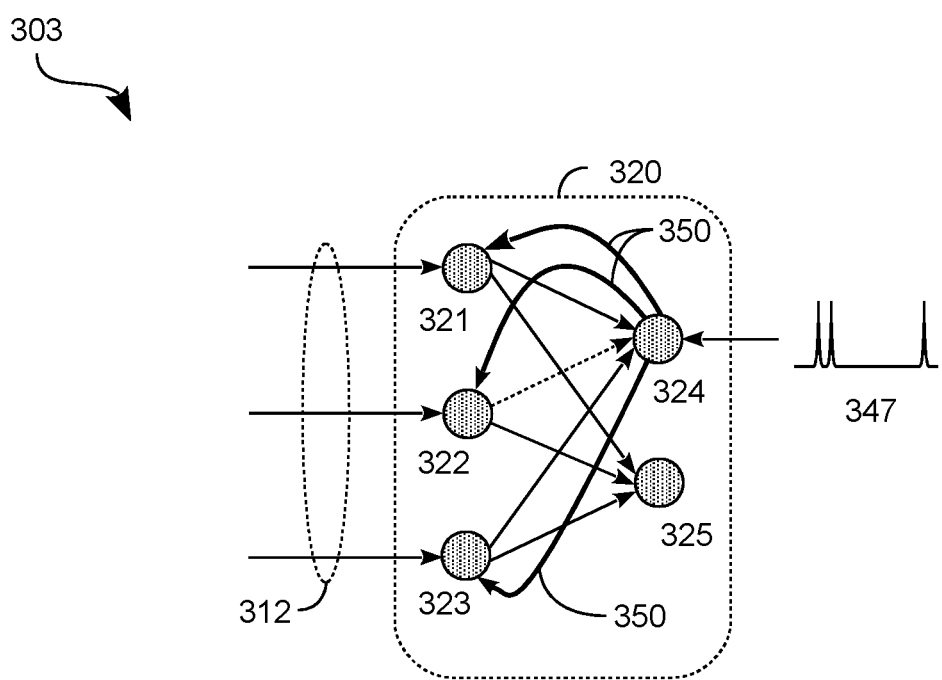

FIG. 3B shows stages of a test process (e.g., an image recognition process), according to some embodiments, using a spiked neural network which, in this example, is the same spiked neural network 320 that has been trained as shown in FIG. 3A. The test process may include a forward test stage 302 which is to generate a preliminary neural network output based on encoded image data representing a real-world (or "noisy") image of an object.

In the illustrative embodiment shown, one or more input nodes (e.g., including each of input nodes 321-323) each receive a respective portion of encoded image data 312. Forward test stage 302 may include input nodes 321-323 beginning, in response to encoded image data 312, the communication of various spike trains between respective nodes of spiking neural network 320. Such communication may propagate signal spikes forward in the neural network 320 (shown as a right-to-left direction), and provide one or more output signals based on the encoded image data 312. For example, output node 324 may provide an output signal spike 332 which is indicative of an image type represented by the encoded image data 312. Identification of the particular image type include evaluating output spike train 332—e.g., based on reference data 340.

Similar to processing during forward training stage 300, the forward test stage 302 may include determining, based on reference data 340, which of output signaling types 342, 344, 346 is a closest match to output spike train 332 and/or which (if any) of output signaling types 342, 344, 346 is a sufficiently close match to output spike train 332. In the illustrative scenario shown, output signaling type 344 is identified as a closest match to output spike train 332—e.g., based on a similarity of respective spike patterns and/or based on a correspondence of node 324 to output signaling type 344. Alternatively, another of output signaling types 342, 344, 346 may be identified where, for example, encoded image data 312 represented a different image type and, accordingly, resulted in a different output signaling by one or more output nodes.

As shown at feedback test stage 303, one or more feedback test signals (e.g., including the illustrative feedback spike trains 350 shown) may be subsequently communicated each to a respective node of spiking neural network 320, the one or more feedback test signals based on the output signaling which is generated by the forward test stage 302. In some embodiments, feedback spike trains 350 include or are otherwise based on the output signaling type 344 which was identified as corresponding to output spike train 332. For example, feedback spike trains 350 may each include or be based on a spike train 347 which represents an exemplary version of output signaling type 344. Although some embodiments are not limited in this regard, generation of feedback spike trains 350 may be based on spike train 347 being provided to the output node 324 which generated output spike train 332.

Feedback spike trains 350 may be sent variously to respective nodes of spiking neural network 320—e.g., wherein each of input nodes 321-323 receives a respective one of feedback spike trains 350. In such an embodiment, some or all of input nodes 321-323 may be variously excited to perform, or inhibited from performing, additional signal spiking based on encoded image data 312. For example, some or all of input nodes 321-323 may each concurrently receive both a respective one of feedback spike trains 350 and a respective portion of the encoded image data 312 on which feedback spike trains 350 are based. Based on the feedback signaling, some or all of input nodes 321-323 may variously change—e.g., amplify or inhibit (partially or entirely)—subsequent responses to the input signaling of encoded image data 312. For example, a given one of input nodes 321-323 may be configured, based on a received feedback signal, to selectively allow (e.g., including amplify) or inhibit its subsequent signal response to encoded image data 312.

In the example scenario shown, feedback spike trains 350 variously enable or amplify continued signal spiking by input nodes 321, 323 based on encoded image data 312. However, one of feedback spike trains 350 may attenuate or prohibit continued signal spiking by input node 322 based on encoded image data 312.

For example, input node 322 may be receiving (and/or may be particularly sensitive to) signal components of the encoded image data 312 which are due to extraneous ("noisy") components of the test image—i.e., components other than those of an imaged object to be recognized. Based on signaling of feedback test stage 303, the spiking neural network 320 may provide subsequent output signaling (e.g., including a later sampling of output spike train 332). Evaluation of such later output signaling may result in the identification of an image under test as belonging to a particular image type (e.g., wherein an object represented by the test image is identified as belonging to a particular object type).

FIGS. 4 through 7 show features of respective neural networks 400, 500, 600, 700 to variously provide feedback signaling each to facilitate data classification according to a corresponding embodiment. Communication of such feedback signaling may, for example, be according to method 200—e.g., wherein some or all of neural networks 400, 500, 600, 700 each include one or more features of spiking neural network 105.

To avoid obscuring certain features of various embodiments, spiking neural networks 400, 600 and 700 are variously shown as each having a topology wherein each of three input nodes are variously coupled to each of two output nodes, with no intervening nodes coupled therebetween. However, the particular number and configuration of nodes in any one of spiking neural networks 400, 600 and 700 is merely illustrative, and any of various other spiking neural network topologies (e.g., including one or more additional layers and/or other arrangements of nodes) may be used, in different embodiments, to enable the updating of synaptic weights based on feedback signaling.

Figure 4:
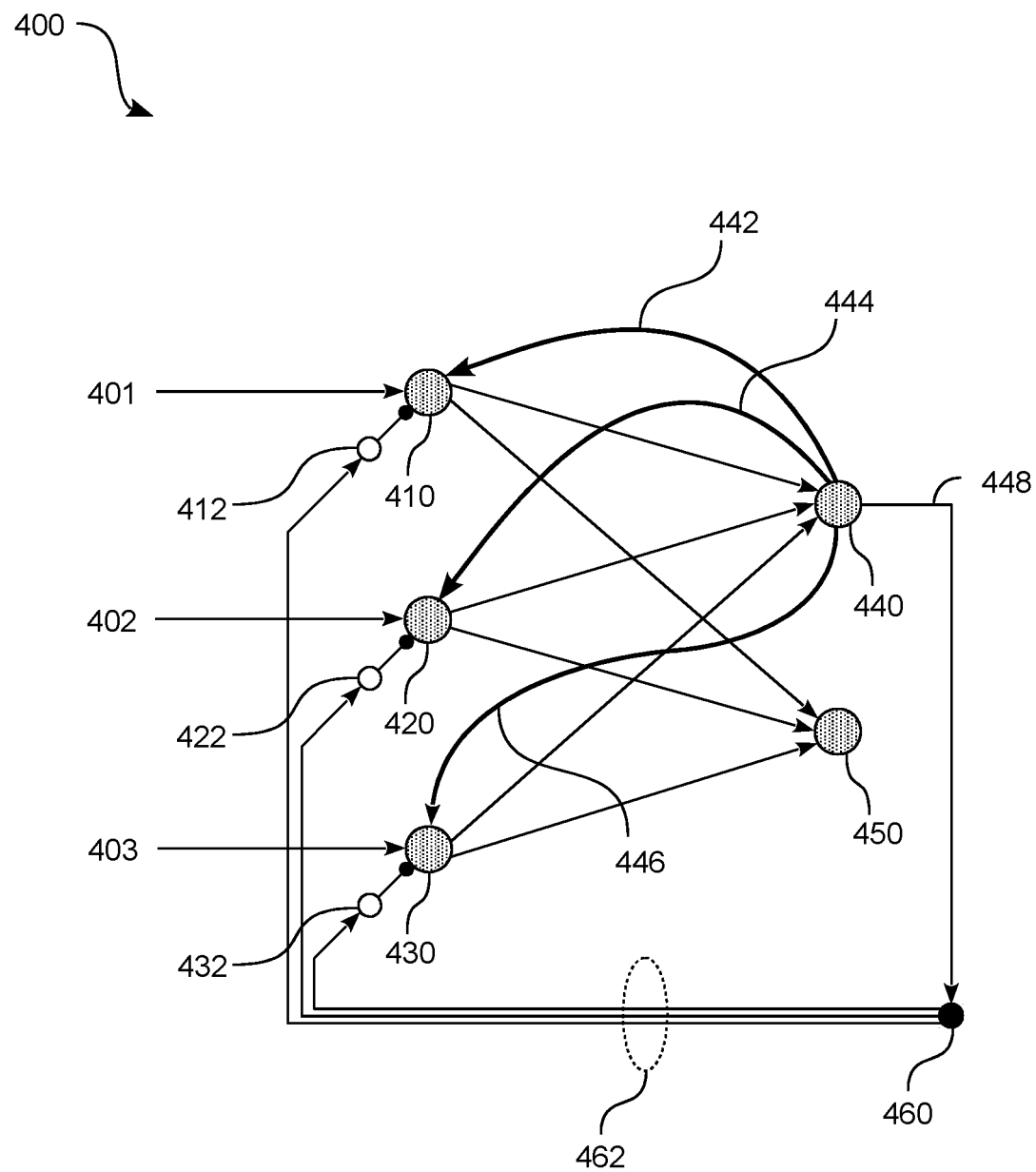
FIG. 4 shows diagrams illustrating stages of processing to perform image recognition with a spiking neural network according to an embodiment.

As shown in FIG. 4, spiking neural network 400 may include one or more input nodes each to receive respective signaling which represents test data at least in part. For example, the illustrative input nodes 410, 420, 430 of spiking neural network 400 may each receive a respective one of test signaling 401, 402, 403 that represents a test image. Before receiving test signaling 401, 402, 403, spiking neural network 400 may be trained to detect whether a given test image is an instance of a particular image type—e.g., wherein spiking neural network 400 is trained to detect any of some plurality of image types.

Based on such training, and further based on test signaling 401, 402, 403, nodes of spiking neural network 400 may variously communicate respective spike trains with each other (where each such spike train is communicated via a respective synapse of spiking neural network 400). This spike train communication may result in output signaling by spiking neural network 400—e.g., wherein including an output node 440 of spiking neural network 400 providing an output spike train 448 which is based on test signaling 401, 402, 403. The output spike train may provide a basis for one or more feedback signals being communicated each to a respective node of spiking neural network 400. In the example embodiment shown, such feedback signaling includes feedback spike trains 442, 444, 446 provided, respectively, to input nodes 410, 420, 430. Alternatively or in addition, such feedback signaling may include one or more feedback signals 462 variously provided each to a respective one of inhibitor nodes 412, 422, 423.

Input nodes 410, 420, 430 may be variously coupled each to receive from a respective one of inhibitor nodes 412, 422, 423 signaling—based on feedback signals 462—which is to contribute to a disabling or other inhibition of that input node's signal response characteristics. Concurrently, the respective signal response characteristics of input nodes 410, 420, 430 may be variously enabled, amplified or otherwise excited each based on a respective one of feedback spike trains 442, 444, 446. Accordingly, signal responses of input nodes 410, 420, 430 to test signaling 401, 402, 403 (respectively) may be selectively controlled each based on a respective combination of one of feedback signals 462 and one of feedback spike trains 442, 444, 446.

In one example embodiment, spike train 448 is communicated to a node 460 of spiking neural network 400 (or in other embodiments, to circuitry which is external to spiking neural network) that is configured to generate feedback signals 462 based on spike train 448. Some or all of feedback signals 462 may each be a relayed version of spike train 448—e.g., wherein node 460 provides a phase shift or otherwise delays signal spiking of the received spike train 448. Alternatively, some or all of feedback signals 462 may each be an exemplar of an output signal type which most closely matches spike train 448. In such an embodiment, some or all of feedback spike trains 442, 444, 446 may each include a version of output spike train 448—e.g., where such one or more feedback spike trains are each a phase shifted or otherwise delayed version of output spike train 448. In some embodiments, generation of feedback signals 462 may include selecting output spike train 448 over another output spike train—if any—which another output node 450 (for example) might generate based on test signaling 401, 402, 403.

Based on feedback signals 462 and feedback spike trains 442, 444, 446, signal spiking by an input node may be selectively enabled, amplified or otherwise excited—e.g., in proportion to, or otherwise based on, a correlation between that input node's signal spiking and spiking by output spike train 448. Alternatively or in addition, signal spiking by another input node may be selectively disabled, attenuated or otherwise inhibited based on feedback signals 462 and feedback spike trains 442, 444, 446—e.g., where that input node's signal spiking exhibits a relatively weak correlation with spiking by output spike train 448.

Figure 5:
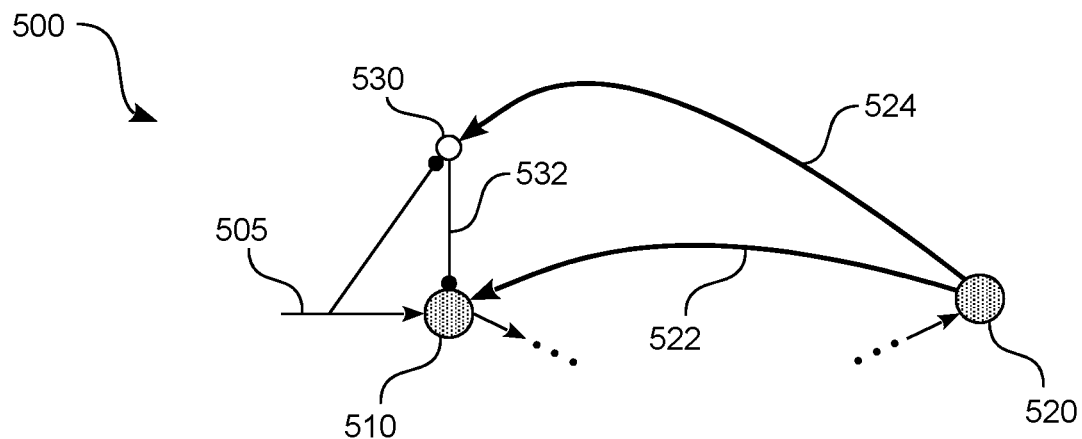
FIG. 5 is a circuit diagram illustrating elements of a spiking neural network to perform image recognition according to an embodiment.

FIG. 5 shows a portion of a spiking neural network 500 which includes a configuration of feedback signaling paths and an inhibitor node, wherein the configuration facilitates the selective excitation or inhibition of a signal response by an input node. As shown in FIG. 5, an input node 510 of spiking neural network 500 may be coupled to receive input signaling 505 which is at least part of encoded image data to represent a test image. Based on input signaling 505, input node 510 may provide one or more signal spikes each to a respective node of spiking neural network 500. In such an embodiment, spiking neural network 500 may further comprise one or more other input nodes (not shown) which, for example, receive the same input signaling 505 or (alternatively) other input signaling which, in combination with input signaling 505, represent the test image.

Spike trains—e.g., including one or more spike trains based on input signaling 505—may be subsequently communicated within spiking neural network 500, resulting in output signaling such as an output spike train from an output node 520. In such an embodiment, spiking neural network 500 may comprise synapses to variously communicate feedback signaling which is based on (e.g., which includes) such an output spike train. For example, spiking neural network may further comprise an inhibitor node 530, wherein output node 520 provides feedback spike trains 522, 524 to input node 510 and inhibitor node 530, respectively. In some embodiments, feedback spike trains 522, 524 are the same signal and/or are the same as an output spike train from output node 520.

Inhibitor node 530 may be coupled, for example, to provide an inhibitor signal 532 to input node 510. The inhibitor signal 532 may selectively contribute to an inhibition of a signal response by input node 510 which (e.g., but for inhibitor signal 532) would otherwise be in response to input signaling 505. For example, a value, spiking pattern or other characteristic of inhibitor signal 532 may indicate to input node 510 that the generating of one or more output signal spikes—based on a portion of input signaling 505—is to be disabled, attenuated or otherwise inhibited. In some embodiments, inhibitor signal 532 contributes to an inhibition input node 510 when there is no signal spiking by input signaling 505 (e.g., where, for example, input node 510 might otherwise output a signal response to its receipt of feedback spike train 522). This may ensure that input node 510 does not provide at least some type of signal response unless there is spiking by input signal 505.

One or more other signals received by inhibitor node 530 may variously promote—or alternatively, inhibit—the generation of inhibitor signal 532. Alternatively or in addition, one or more other signals received by input node 510 may variously increase—or alternatively, decrease—a responsiveness by input node 510 to inhibitor signal 532. By way of illustration and not limitation, feedback signal 524 may be provided as an excitation signal to inhibitor node 530—e.g., wherein input signaling 505 is provided to inhibitor node 530 as an inhibitor signal to counteract, at least in part, feedback signal 524. In such an embodiment, feedback spike train 522 may be provided to input node 510 as an excitation signal to counteract, at least in part, inhibitor signal 532.

In one example embodiment, a node may be coupled to receive both one or more excitation signals and one or more inhibitor signals may—e.g., wherein the node is any of a variety of input nodes such as input node 510 or any of a variety of inhibitor nodes such as inhibitor node 530. At a given time, some or all of the one or more excitation signals may each be currently indicating that a signal response is to be provided by the node—e.g., wherein some or all of the one or more inhibitor signals are each concurrently indicating that the signal response is to be inhibited. Those of the one or more excitation signals which are currently asserted at that given time may indicate or otherwise correspond to a total excitation score which, for example, is a count (weighted or unweighted) of currently-asserted excitation signals. Alternatively or in addition, those of the one or more inhibitor signals which are currently asserted may indicate a total inhibition score—e.g., including a weighted (or unweighted) count of currently-asserted inhibitor signals. In such an embodiment, the signal response may be selectively provided by the node (or inhibited by the node) based on a relationship of such a total excitation score and a total inhibition score. By way of illustration and not limitation, the node may provide the signal response only where the total excitation score is greater than the total inhibition score. For example, inhibitor node 530 may selectively assert inhibitor signal 532 only at times when feedback signal 524 is asserted while input signaling 505 is not being asserted (e.g., wherein "asserted" in this contest, refers to a given signal satisfying some predetermined signal characteristic criteria). Alternatively or in addition, input node 510 may selectively provide a signal response to input signaling 505 only at times when feedback signal 524 is asserted while inhibitor signal 532 is not being asserted.

Figure 6:
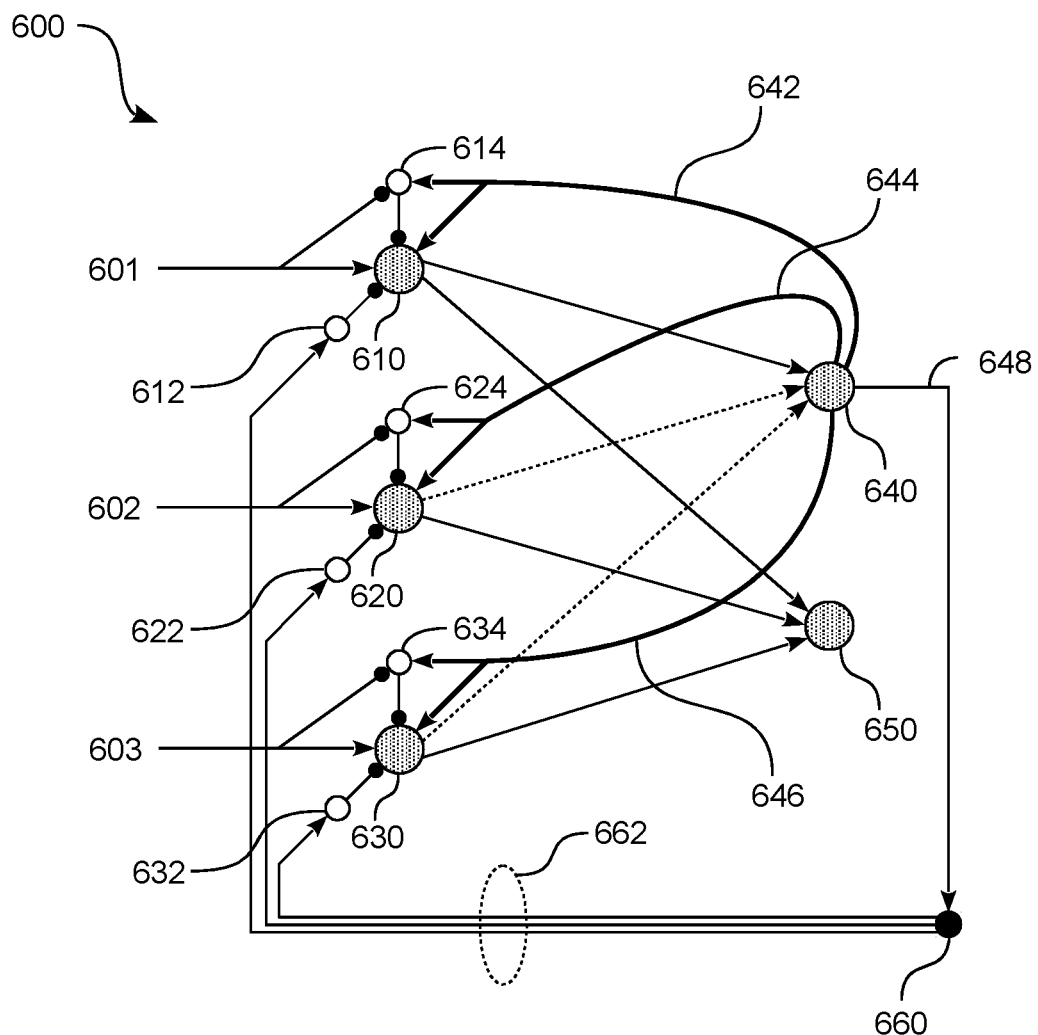
FIG. 6 is a circuit diagram illustrating elements of a neural circuit to perform image recognition according to an embodiment.

As shown in FIG. 6, spiking neural network 600 may include one or more input nodes, such as the illustrative input nodes 610, 620, 630 shown, each to receive a respective one of test signaling 601, 602, 603 that represents a test image. Such receiving may take place after spiking neural network 600 may be trained to detect whether a given test image is an instance of a particular image type.

Spiking neural network 600 may include one or more features of spiking neural network 400, in some embodiments. For example, spiking neural network 600 may include input nodes 610, 620, 630 that correspond functionally to input nodes 410, 420, 430, respectively. In such an embodiment, output nodes 640, 650 of spiking neural network 400 may correspond functionally to output nodes 440, 450, respectively—e.g., wherein inhibitor nodes 612, 622, 632 of spiking neural network 400 correspond functionally to inhibitor nodes 412, 422, 432, respectively.

Input nodes 610, 620, 630 may receive test signaling 601, 602, 603 which communicates encoded image data that, for example, is similar to that of test signaling 401, 402, 403. Based on an earlier training of spiking neural network, and further based on test signaling 601, 602, 603, spike trains may be variously communicated each between a respective two nodes of spiking neural network 600. This may result in output signaling—such as the illustrative output spike train 648 from node 640—which is indicates that test signaling 601, 602, 603 corresponds to a particular image type.

Spiking neural network 600 may provide feedback signaling which includes or is otherwise based on signaling by output node 640. Such feedback signaling may include, for example, one or more feedback signals 662 and feedback spike trains 642, 644, 646 (e.g., corresponding functionally to one or more feedback signals 462 and feedback spike trains 442, 444, 446). In the example shown, one or more feedback signals 662 are generated by a node 660 based on output spike train 648. Feedback spike trains 642, 644, 646 may be provided—each as an excitation signal—to input nodes 610, 620, 630, respectively. Furthermore, the one or more feedback signals 462 may each be provided to a respective one of inhibitor nodes 612, 622, 632 to facilitate selective inhibition of signal spiking by input nodes 610, 620, 630. Additional inhibitor nodes (such as the illustrative inhibitor nodes 614, 624, 634 shown) may further facilitate the selective inhibition of signal spiking by input nodes 610, 620, 630. For example, feedback spike trains 642, 644, 646 may be further coupled to contribute to excitation of inhibitor nodes 614, 624, 634, respectively—e.g., where test signaling 601, 602, 603 further contributes to inhibition of inhibitor nodes 614, 624, 634, respectively. Such a configuration of inhibitor nodes 614, 624, 634 may provide additional mechanisms for controlling the use of feedback signaling to selectively excite and/or inhibit various ones of input nodes 610, 620, 630.

Figure 7:
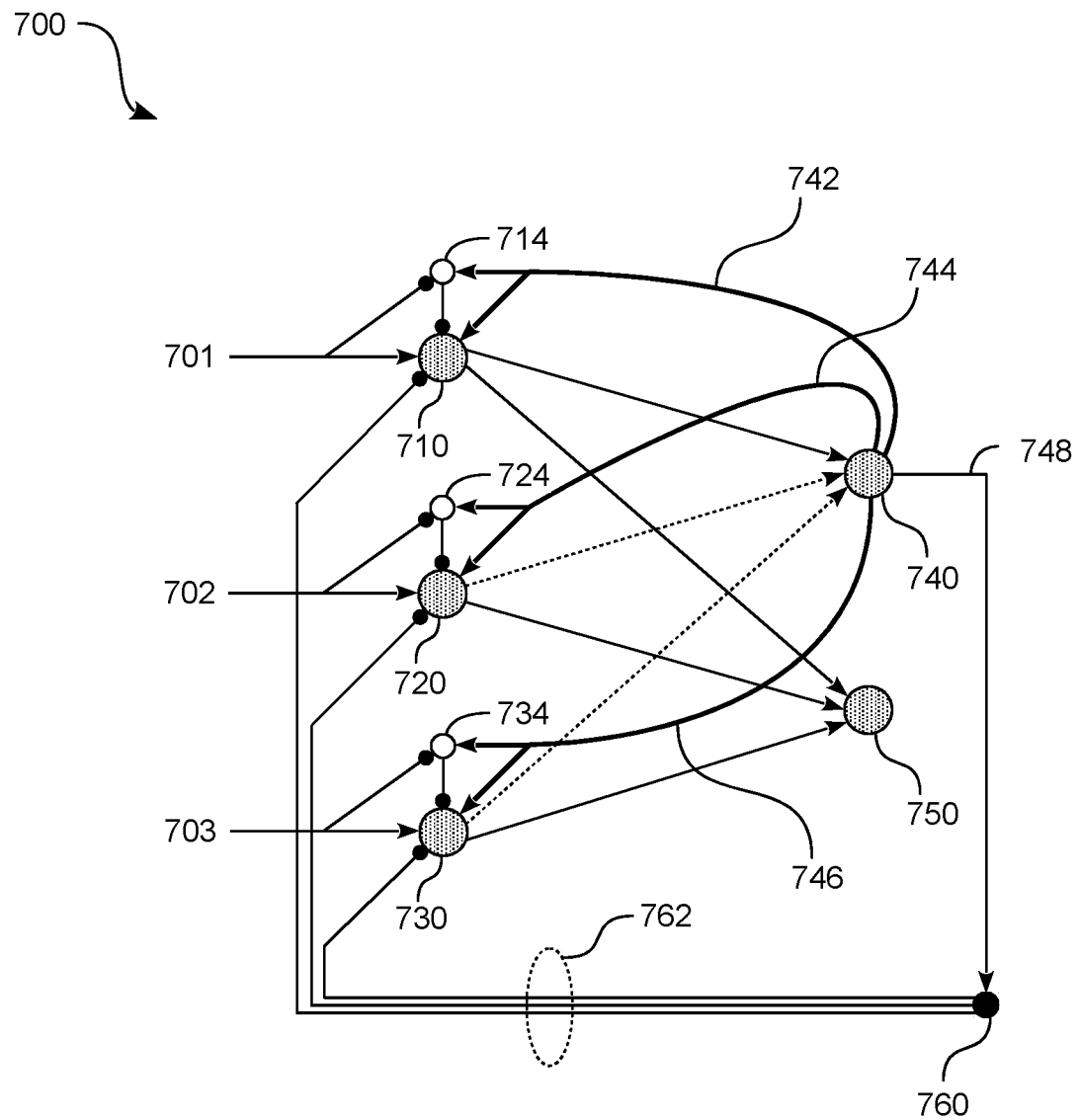
FIG. 7 is a circuit diagram illustrating elements of a spiking neural network to perform image recognition according to an embodiment.

As shown in FIG. 7, spiking neural network 700 may include one or more input nodes, such as the illustrative input nodes 710, 720, 730 shown, each to receive a respective one of test signaling 701, 702, 703 that represents a test image. Such receiving may take place after spiking neural network 700 may be trained to detect whether a given test image is an instance of a particular image type.

Spiking neural network 700 may include one or more features of spiking neural network 600, in some embodiments. For example, spiking neural network 700 may include input nodes 710, 720, 730 that correspond functionally to input nodes 610, 620, 630, respectively. In such an embodiment, output nodes 740, 750 of spiking neural network 600 may correspond functionally to output nodes 640, 650, respectively—e.g., wherein inhibitor nodes 714, 724, 734 of spiking neural network 600 correspond functionally to inhibitor nodes 614, 624, 634, respectively.

Input nodes 710, 720, 730 may receive test signaling 701, 702, 703 which, for example, represents encoded image data. Based on an earlier training of spiking neural network, and further based on test signaling 701, 702, 703, spike trains may be variously communicated each between a respective two nodes of spiking neural network 700. This may result in node 740 providing an output spike train 748 which indicates that test signaling 701, 702, 703 corresponds to a particular image type which spiking neural network 700 has been trained to recognize.

Spiking neural network 700 may provide feedback signaling which includes or is otherwise based on signaling by output node 740. Such feedback signaling may include, for example, one or more feedback signals 762 and feedback spike trains 742, 744, 746 (e.g., corresponding functionally to one or more feedback signals 662 and feedback spike trains 642, 644, 646). In the example shown, one or more feedback signals 762 are generated by a node 760 based on output spike train 748. Feedback spike trains 742, 744, 746 may be provided—each as an excitation signal—both to input nodes 710, 720, 730, respectively and to inhibitor nodes 714, 724, 734, respectively. Furthermore, the one or more feedback signals 762 may be provided—each as an inhibitor signal—to a respective one of input nodes 710, 720, 730. In such an embodiment, test signaling 701, 702, 703 may be variously coupled to further contribute to inhibition of inhibitor nodes 714, 724, 734, respectively. The configuration of inhibitor nodes 714, 724, 734 may enable improved utilization of feedback signaling to selectively excite and/or inhibit various ones of input nodes 710, 720, 730.

Figure 8:
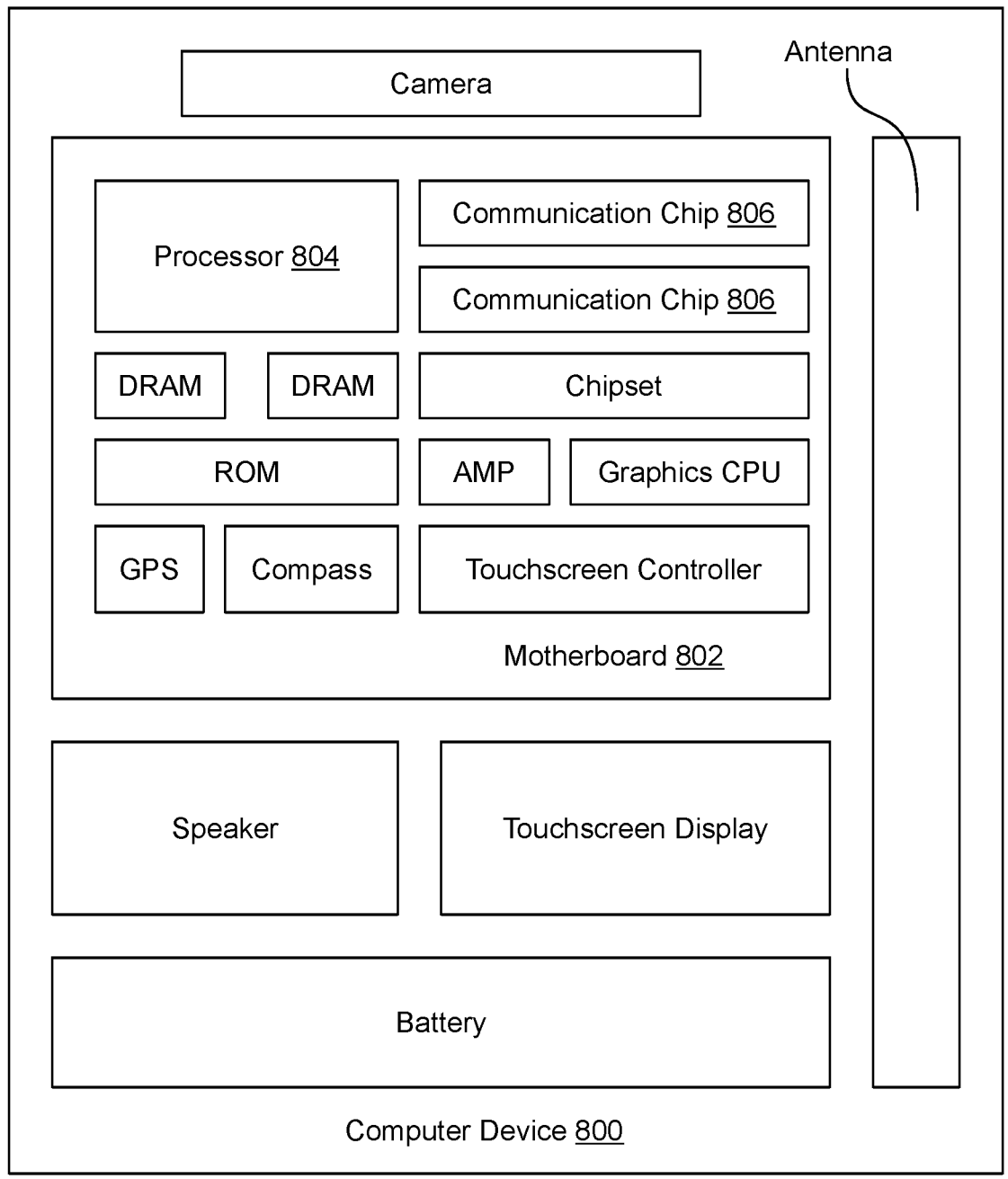
FIG. 8 is a functional block diagram illustrating a computing device in accordance with one embodiment.

FIG. 8 illustrates a computing device 800 in accordance with one embodiment. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. The term "processor" may refer to any device or portion of a device that processes electronic data from registers and/or memory to transform that electronic data into other electronic data that may be stored in registers and/or memory. The communication chip 806 also includes an integrated circuit die packaged within the communication chip 806.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 9:
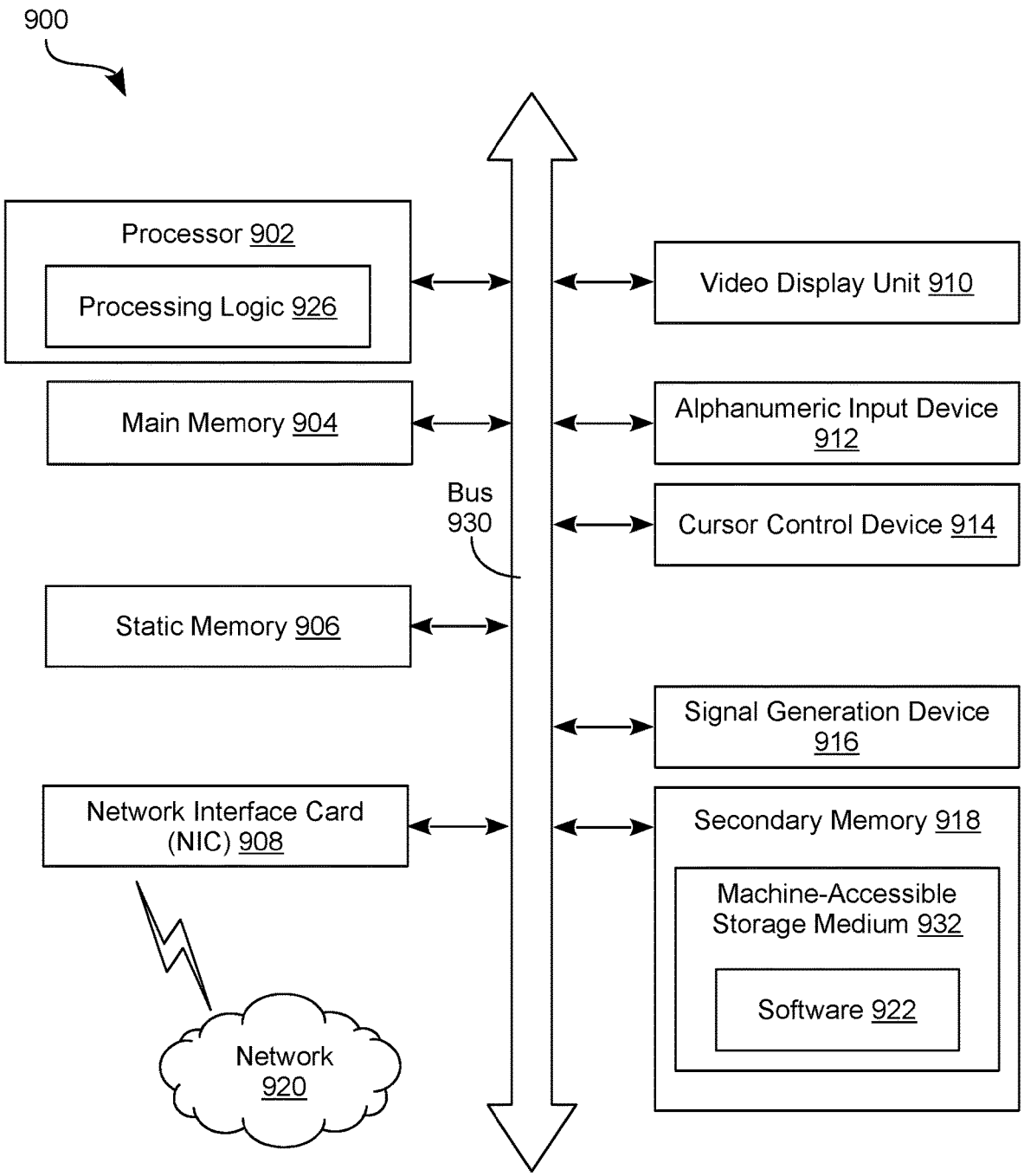
FIG. 9 is a functional block diagram illustrating an exemplary computer system, in accordance with one embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for pattern recognition using a spiking neural network, the computer device comprising circuitry to receive an input image comprising a plurality of pixels, encode the input image to generate encoded image data, and apply a trained spiking neural network to the encoded image data, wherein one or more nodes of the trained spiking neural network each receive a respective spiked input signal based on the encoded image data. The circuitry is further to generate one or more spiked output signals based on the applying the trained spiking neural network to the encoded image data, generate one or more feedback signals based on the spiked output signals, and adjust, based on the one or more feedback signals, synapse weights each associated with a respective node of the trained spiking neural network.

In Example 2, the subject matter of any one or more of Examples 1 optionally includes the computer device further comprising circuitry to train the spiking neural network based on one or more reference images each representing a low-noise representation of a respective object which the spiking neural network is to be configured to recognize.

In Example 3, the subject matter of any one or more of Examples 2 optionally includes wherein the circuitry to train the spiking neural network comprises circuitry to perform a forward training stage and a feedback training stage each based on the one or more reference images.

In Example 4, the subject matter of any one or more of Examples 3 optionally includes wherein the circuitry to perform the forward training stage comprises circuitry which, for each reference image of the one or more reference images, is to encode the reference image to generate encoded reference image data including a respective one or more reference spiked input signal, receive the respective one or more reference spiked input signal with the plurality of nodes of the spiking neural network, and generate with the spiked neural network a respective one or more reference spiked output signals based on the respective one or more reference spiked input signal.

In Example 5, the subject matter of any one or more of Examples 4 optionally includes wherein, for each reference image of the one or more reference images based on the respective one or more reference spiked input signals, other spiked signals are each communicated between a respective two nodes of the spiking neural network via a synapse that connects the respective two nodes to each other.

In Example 6, the subject matter of any one or more of Examples 3 optionally includes wherein the circuitry to perform the forward training stage further comprises circuitry to adjust one or more weights each associated with a respective synapse of the spiking neural network, wherein the one or more weights are adjusted each based on a timing of signals spiking in the spiking neural network during the forward training stage.

In Example 7, the subject matter of any one or more of Examples 3 optionally includes wherein the circuitry to perform the feedback training stage comprises circuitry to receive one or more reference spiked output signals generated by the forward training stage, and generate a feedback signal based on the one or more reference spiked output signals generated by the forward training stage.

In Example 8, the subject matter of any one or more of Examples 3 optionally includes wherein the circuitry to perform the feedback training stage comprises circuitry to adjust one or more weights each associated with a respective synapse of the spiking neural network, wherein the one or more weights are adjusted each based on a timing of signals spiking in the spiking neural network during the feedback training stage.

Example 9 is at least one machine readable medium including instructions that, when executed by a machine, cause the machine to perform operations for pattern recognition using a spiking neural network, the operations comprising receiving an input image comprising a plurality of pixels, encoding the input image to generate encoded image data, and applying a trained spiking neural network to the encoded image data, wherein one or more nodes of the trained spiking neural network each receive a respective spiked input signal based on the encoded image data. The operations further comprise generating one or more spiked output signals based on the applying the trained spiking neural network to the encoded image data, generating one or more feedback signals based on the spiked output signals, and based on the one or more feedback signals, adjusting synapse weights each associated with a respective node of the trained spiking neural network.

In Example 10, the subject matter of any one or more of Examples 9 optionally includes the operations further comprising training the spiking neural network based on one or more reference images each representing a low-noise representation of a respective object which the spiking neural network is to be configured to recognize.

In Example 11, the subject matter of any one or more of Examples 10 optionally includes wherein training the spiking neural network comprises a forward training stage and a feedback training stage each based on the one or more reference images.

In Example 12, the subject matter of any one or more of Examples 11 optionally includes wherein the forward training stage comprises, for each reference image of the one or more reference images, encoding the reference image to generate encoded reference image data including a respective one or more reference spiked input signal, receiving the respective one or more reference spiked input signal with the plurality of nodes of the spiking neural network, and generating with the spiked neural network a respective one or more reference spiked output signals based on the respective one or more reference spiked input signal.

In Example 13, the subject matter of any one or more of Examples 12 optionally includes wherein, for each reference image of the one or more reference images based on the respective one or more reference spiked input signals, other spiked signals are each communicated between a respective two nodes of the spiking neural network via a synapse that connects the respective two nodes to each other.

In Example 14, the subject matter of any one or more of Examples 11 optionally includes wherein the forward training stage further comprises adjusting one or more weights each associated with a respective synapse of the spiking neural network, wherein the one or more weights are adjusted each based on a timing of signals spiking in the spiking neural network during the forward training stage.

In Example 15, the subject matter of any one or more of Examples 11 optionally includes wherein the feedback training stage comprises receiving one or more reference spiked output signals generated by the forward training stage, and generating a feedback signal based on the one or more reference spiked output signals generated by the forward training stage.

In Example 16, the subject matter of any one or more of Examples 11 optionally includes wherein the feedback training stage comprises adjusting one or more weights each associated with a respective synapse of the spiking neural network, wherein the one or more weights are adjusted each based on a timing of signals spiking in the spiking neural network during the feedback training stage.

Example 17 is a computer method for pattern recognition using a spiking neural network, the method comprising receiving an input image comprising a plurality of pixels, encoding the input image to generate encoded image data, and applying a trained spiking neural network to the encoded image data, wherein one or more nodes of the trained spiking neural network each receive a respective spiked input signal based on the encoded image data. The method further comprises generating one or more spiked output signals based on the applying the trained spiking neural network to the encoded image data, generating one or more feedback signals based on the spiked output signals, and based on the one or more feedback signals, adjusting synapse weights each associated with a respective node of the trained spiking neural network.

In Example 18, the subject matter of any one or more of Examples 17 optionally includes the method further comprising training the spiking neural network based on one or more reference images each representing a low-noise representation of a respective object which the spiking neural network is to be configured to recognize.

In Example 19, the subject matter of any one or more of Examples 18 optionally includes wherein training the spiking neural network comprises a forward training stage and a feedback training stage each based on the one or more reference images.

In Example 20, the subject matter of any one or more of Examples 19 optionally includes wherein the forward training stage comprises, for each reference image of the one or more reference images, encoding the reference image to generate encoded reference image data including a respective one or more reference spiked input signal, receiving the respective one or more reference spiked input signal with the plurality of nodes of the spiking neural network, and generating with the spiked neural network a respective one or more reference spiked output signals based on the respective one or more reference spiked input signal.

In Example 21, the subject matter of any one or more of Examples 20 optionally includes wherein, for each reference image of the one or more reference images based on the respective one or more reference spiked input signals, other spiked signals are each communicated between a respective two nodes of the spiking neural network via a synapse that connects the respective two nodes to each other.

In Example 22, the subject matter of any one or more of Examples 19 optionally includes wherein the forward training stage further comprises adjusting one or more weights each associated with a respective synapse of the spiking neural network, wherein the one or more weights are adjusted each based on a timing of signals spiking in the spiking neural network during the forward training stage.

In Example 23, the subject matter of any one or more of Examples 19 optionally includes wherein the feedback training stage comprises receiving one or more reference spiked output signals generated by the forward training stage, and generating a feedback signal based on the one or more reference spiked output signals generated by the forward training stage.

In Example 24, the subject matter of any one or more of Examples 19 optionally includes wherein the feedback training stage comprises adjusting one or more weights each associated with a respective synapse of the spiking neural network, wherein the one or more weights are adjusted each based on a timing of signals spiking in the spiking neural network during the feedback training stage.

Techniques and architectures for providing data classification functionality with a spiking neural network are described herein. In the above description, for purposes of explanation, numerous specific details are set forth in order to provide a thorough understanding of certain embodiments. It will be apparent, however, to one skilled in the art that certain embodiments may be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for pattern recognition using a spiking neural network, the computer device comprising circuitry to:
   receive an input image comprising a plurality of pixels;
   encode the input image to generate encoded image data;
   apply a trained spiking neural network to the encoded image data, wherein one or more nodes of the trained spiking neural network each receive a respective spiked input signal based on the encoded image data;
   generate one or more spiked output signals based on the applying the trained spiking neural network to the encoded image data;
   access reference data which identifies multiple signal types which correspond each to a different respective image type;
   based on the reference data, perform a selection of a first signal type of the multiple signal types over one or more others of the multiple signal types, wherein performing the selection comprises identifying that, of the multiple signal types, the first signal type is a closest match to the one or more spiked output signals;
   generate one or more feedback signals based on the selection, wherein the one or more feedback signals each represent a predefined ideal of a respective output signal corresponding to the first signal type; and
   adjust, based on the one or more feedback signals, synapse weights each associated with a respective node of the trained spiking neural network.

2. The computer device of claim 1, further comprising circuitry to:
   train the spiking neural network based on one or more reference images each representing a low-noise representation of a respective object which the spiking neural network is to be configured to recognize.

3. The computer device of claim 2, wherein the circuitry to train the spiking neural network comprises circuitry to perform a forward training stage and a feedback training stage each based on the one or more reference images.

4. The computer device of claim 3, wherein the circuitry to perform the forward training stage comprises circuitry to:
   for each reference image of the one or more reference images:
      encode the reference image to generate encoded reference image data including a respective one or more reference spiked input signal;
      receive the respective one or more reference spiked input signal with the plurality of nodes of the spiking neural network; and
      generate with the spiked neural network a respective one or more reference spiked output signals based on the respective one or more reference spiked input signal.

5. The computer device of claim 4, wherein, for each reference image of the one or more reference images:
   based on the respective one or more reference spiked input signals, other spiked signals are each communicated between a respective two nodes of the spiking neural network via a synapse that connects the respective two nodes to each other.

6. The computer device of claim 3, wherein the circuitry to perform the forward training stage further comprises circuitry to:
   adjust one or more weights each associated with a respective synapse of the spiking neural network, wherein the one or more weights are adjusted each based on a timing of signals spiking in the spiking neural network during the forward training stage.

7. The computer device of claim 3, wherein the circuitry to perform the feedback training stage comprises circuitry to:
   receive one or more reference spiked output signals generated by the forward training stage; and
   generate a feedback signal based on the one or more reference spiked output signals generated by the forward training stage.

8. The computer device of claim 3, wherein the circuitry to perform the feedback training stage comprises circuitry to:
   adjust one or more weights each associated with a respective synapse of the spiking neural network, wherein the one or more weights are adjusted each based on a timing of signals spiking in the spiking neural network during the feedback training stage.

9. At least one non-transitory machine readable medium including instructions that, when executed by a machine, cause the machine to perform operations for pattern recognition using a spiking neural network, the operations comprising:
   receiving an input image comprising a plurality of pixels;
   encoding the input image to generate encoded image data;
   applying a trained spiking neural network to the encoded image data, wherein one or more nodes of the trained spiking neural network each receive a respective spiked input signal based on the encoded image data;
   generating one or more spiked output signals based on the applying the trained spiking neural network to the encoded image data;
   accessing reference data which identifies multiple signal types which correspond each to a different respective image type;
   based on the reference data, performing a selection of a first signal type of the multiple signal types over one or more others of the multiple signal types, wherein performing the selection comprises identifying that, of the multiple signal types, the first signal type is a closest match to the one or more spiked output signals;
generating one or more feedback signals based on the selection, wherein the one or more feedback signals each represent a predefined ideal of a respective output signal corresponding to the first signal type; and
based on the one or more feedback signals, adjusting synapse weights each associated with a respective node of the trained spiking neural network.

10. The at least one non-transitory machine readable medium of claim 9, the operations further comprising:
training the spiking neural network based on one or more reference images each representing a low-noise representation of a respective object which the spiking neural network is to be configured to recognize.

11. The at least one non-transitory machine readable medium of claim 10, wherein training the spiking neural network comprises a forward training stage and a feedback training stage each based on the one or more reference images.

12. The at least one non-transitory machine readable medium of claim 11, wherein the forward training stage comprises:
for each reference image of the one or more reference images:
encoding the reference image to generate encoded reference image data including a respective one or more reference spiked input signal;
receiving the respective one or more reference spiked input signal with the plurality of nodes of the spiking neural network; and
generating with the spiked neural network a respective one or more reference spiked output signals based on the respective one or more reference spiked input signal.

13. The at least one non-transitory machine readable medium of claim 12, wherein, for each reference image of the one or more reference images:
based on the respective one or more reference spiked input signals, other spiked signals are each communicated between a respective two nodes of the spiking neural network via a synapse that connects the respective two nodes to each other.

14. The at least one non-transitory machine readable medium of claim 11, wherein the forward training stage further comprises:
adjusting one or more weights each associated with a respective synapse of the spiking neural network, wherein the one or more weights are adjusted each based on a timing of signals spiking in the spiking neural network during the forward training stage.

15. The at least one non-transitory machine readable medium of claim 11, wherein the feedback training stage comprises:
receiving one or more reference spiked output signals generated by the forward training stage; and
generating a feedback signal based on the one or more reference spiked output signals generated by the forward training stage.

16. The at least one non-transitory machine readable medium of claim 11, wherein the feedback training stage comprises:
adjusting one or more weights each associated with a respective synapse of the spiking neural network, wherein the one or more weights are adjusted each based on a timing of signals spiking in the spiking neural network during the feedback training stage.

17. A computer method for pattern recognition using a spiking neural network, the method comprising:
receiving an input image comprising a plurality of pixels;
encoding the input image to generate encoded image data;
applying a trained spiking neural network to the encoded image data, wherein one or more nodes of the trained spiking neural network each receive a respective spiked input signal based on the encoded image data;
generating one or more spiked output signals based on the applying the trained spiking neural network to the encoded image data;
accessing reference data which identifies multiple signal types which correspond each to a different respective image type;
based on the reference data, performing a selection of a first signal type of the multiple signal types over one or more others of the multiple signal types, wherein performing the selection comprises identifying that, of the multiple signal types, the first signal type is a closest match to the one or more spiked output signals;
generating one or more feedback signals based on the selection, wherein the one or more feedback signals each represent a predefined ideal of a respective output signal corresponding to the first signal type; and
based on the one or more feedback signals, adjusting synapse weights each associated with a respective node of the trained spiking neural network.

18. The method of claim 17, further comprising:
training the spiking neural network based on one or more reference images each representing a low-noise representation of a respective object which the spiking neural network is to be configured to recognize.

19. The method of claim 18, wherein training the spiking neural network comprises a forward training stage and a feedback training stage each based on the one or more reference images.

20. The method of claim 19, wherein the forward training stage comprises:
for each reference image of the one or more reference images:
encoding the reference image to generate encoded reference image data including a respective one or more reference spiked input signal;
receiving the respective one or more reference spiked input signal with the plurality of nodes of the spiking neural network; and
generating with the spiked neural network a respective one or more reference spiked output signals based on the respective one or more reference spiked input signal.

21. The method of claim 20, wherein, for each reference image of the one or more reference images:
based on the respective one or more reference spiked input signals, other spiked signals are each communicated between a respective two nodes of the spiking neural network via a synapse that connects the respective two nodes to each other.

22. The method of claim 19, wherein the forward training stage further comprises:
adjusting one or more weights each associated with a respective synapse of the spiking neural network, wherein the one or more weights are adjusted each based on a timing of signals spiking in the spiking neural network during the forward training stage.

23. The method of claim 19, wherein the feedback training stage comprises:

receiving one or more reference spiked output signals generated by the forward training stage; and
  generating a feedback signal based on the one or more reference spiked output signals generated by the forward training stage.

24. The method of claim 19, wherein the feedback training stage comprises:

adjusting one or more weights each associated with a respective synapse of the spiking neural network, wherein the one or more weights are adjusted each based on a timing of signals spiking in the spiking neural network during the feedback training stage.

\* \* \* \* \*